United States Patent
Harvey

(10) Patent No.: US 10,845,771 B2
(45) Date of Patent: Nov. 24, 2020

(54) AUTOMATED METHOD OF GENERALIZED BUILDING AUTOMATION FROM ATOMIC PHYSICAL MODELS AND CONTROL LOOPS THEREOF

(71) Applicant: Troy Aaron Harvey, Brighton, UT (US)

(72) Inventor: Troy Aaron Harvey, Brighton, UT (US)

(73) Assignee: PASSIVELOGIC, INC., Holladay, UT (US)

( * ) Notice: Subject to any disclaimer, the term of this patent is extended or adjusted under 35 U.S.C. 154(b) by 0 days.

(21) Appl. No.: 15/986,745

(22) Filed: May 22, 2018

(65) Prior Publication Data

US 2018/0335759 A1    Nov. 22, 2018

Related U.S. Application Data

(60) Provisional application No. 62/509,662, filed on May 22, 2017.

(51) Int. Cl.
*G05B 13/04* (2006.01)
*G05B 15/02* (2006.01)

(52) U.S. Cl.
CPC .......... *G05B 13/048* (2013.01); *G05B 15/02* (2013.01); *G05B 2219/2642* (2013.01)

(58) Field of Classification Search
CPC .................. G05B 13/048; G05B 15/02; G05B 2219/2642
See application file for complete search history.

(56) References Cited

U.S. PATENT DOCUMENTS

| | | | |
|---|---|---|---|
| 5,224,648 A | 7/1993 | Simon et al. | |
| 6,119,125 A * | 9/2000 | Gloudeman | G06F 8/20 |
| 6,967,565 B2 | 11/2005 | Lingemann | |
| 7,010,789 B1 * | 3/2006 | Kimelman | G06F 9/5066 |
| | | | 718/100 |
| 9,020,647 B2 | 4/2015 | Johnson et al. | |
| 9,035,479 B1 * | 5/2015 | Gates | G06Q 10/06313 |
| | | | 290/43 |
| 9,258,201 B2 | 2/2016 | McCoy et al. | |
| 9,298,197 B2 | 3/2016 | Matsuoka et al. | |

(Continued)

OTHER PUBLICATIONS

Nassif, N., Kajl, S., & Sabourin, R. (Jul. 2005). Optimization of HVAC control system strategy using two-objective genetic algorithm, Journal of HVAC&R Research, 11(3), 459-486. (Year: 2005).*

(Continued)

*Primary Examiner* — Thomas C Lee
*Assistant Examiner* — Anzuman Sharmin
(74) *Attorney, Agent, or Firm* — Kunzler Bean & Adamson, PC

(57) ABSTRACT

Disclosed is a system and method for classifying units of control and concomitant model units from a larger physical system model. The system enables model-based simulation of decoupled system units for improved simulation efficiency. Further, the system allows for automated reasoning about the classification of said units, producing both machine-interpretable and human-readable, natural language descriptions of the decisions and reasons for said decisions made during the classification process, for use in heuristics and user feedback.

16 Claims, 6 Drawing Sheets

(56) References Cited

U.S. PATENT DOCUMENTS

| | | | |
|---|---|---|---|
| 9,557,750 | B2 | 1/2017 | Gust et al. |
| 9,664,400 | B2 | 5/2017 | Wroblewski et al. |
| 2002/0152298 | A1* | 10/2002 | Kikta .................. H04L 12/2803 709/223 |
| 2006/0106530 | A1* | 5/2006 | Horvitz ................ G08G 1/0104 701/117 |
| 2008/0082183 | A1* | 4/2008 | Judge ..................... G05B 15/02 700/33 |
| 2014/0016472 | A1* | 1/2014 | Porat ................. H04W 28/0231 370/235 |
| 2015/0066229 | A1* | 3/2015 | Lacroix ............... G05B 13/042 700/295 |
| 2017/0076206 | A1* | 3/2017 | Lastras-Montano ......................... G06F 16/3344 |

OTHER PUBLICATIONS

Sushanek, F., Kasneci, G., & Weikum, G. (May 2007). YAGO: A core of semantic knowledge unifying WordNet and Wikipedia, WWW 2007, 1-10. (Year: 2007).*

Maasoumy, M., Pinto, A., & Sangiovanni-Vincentelli, A. (2001). Model-based hierarchical optimal control design for HVAC systems, Proceedings of the ASME 2011 Dynamic Systems and Control Conference, 1-8. (Year: 2011).*

Bordes, A., Weston, J., Collobert, R., & Bengio, Y. (Aug. 2011). Learning structured embeddings of knowledge bases, Proceedings of the Twenty-Fifth AAAI Conference on Artificial Intelligence, 1-6. (Year: 2011).*

Nickel, M., Tresp, V., & Kriegel, H. (2011). A three-way model for collective learning on multi-relational data, Proceedings of the 28th International Conference on Machine Learning, 1-8. (Year: 2011).*

Socher, R., Chen, D., Manning, C., & Ng, A. (Jan. 2013). Reasoning with neural tensor networks for knowledge base completion, 1-10. (Year: 2013).*

Berant, J., Chou, A., Frostig, R., & Liang, P. (Oct. 2013). Semantic parsing on Freebase from question-answer pairs, Proceedings of the 2013 Conference on Empirical Methods in Natural Language Processing, 1533-1544. (Year: 2013).*

Bordes, A., Usunier, N., Garcia-Duran, A..., Weston, J., & Yakhnenko, O. (Apr. 2013). Irreflexive and hierarchical relations as translations, 1-5. (Year: 2013).*

Bordes, A., Usunier, N., Garcia-Duran, A..., Weston, J., & Yakhnenko, O. (Dec. 2013). Translating embeddings for modeling multi-relational data, Neural Information Processing Systems (NIPS), 1-9. (Year: 2013).*

Chang, K., Yih, W., & Meek, C. (Oct. 2013). Multi-relational latent semantic analysis, Proceedings of the Conference on Empirical Methods in Natural Language Processing (EMNLP), 1-11. (Year: 2013).*

Weston, J., Bordes, A., Yakhnenko, O, & Usunier, N. (Jul. 2013). Connecting language and knowledge bases with embedding models for relation extraction, 1-6. (Year: 2013).*

Min, B., Grishman, R., Wan, L., Wang, C., & Gondek, D. (Jun. 2013). Distant supervision for relation extraction with an incomplete knowledge base, Proceedings of NAACL-HLT 2013, 777-782. (Year: 2013).*

Wang, Z., Zhang, J., Feng, J., & Chen, Z. (2014). Knowledge graph embedding by translating on hyperplanes, Proceedings of the Twenty-Eighth AAAI Conference on Artificial Intelligence, 1112-1119. (Year: 2014).*

Yang, B., Yih, W., He, X., Gao, J., & Deng, L. (Dec. 2014). Embedding entities and relations for learning and inference in knowledge bases, 1-12. (Year: 2014).*

Bordes, A., Glorot, X., Weston, J., & Bengio, Y. (2014). A semantic matching energy function for learning with multi-relational data, Machine Learning, 94(2), 233-259. (Year: 2014).*

Lin, Y, Liu, Z., Sun, M., Liu, Y., & Zhu, X. (2015). Learning entity and relation embeddings for knowledge graph completion, In Proceedings of AAAI'15, 1-7. (Year: 2015).*

He, H., Balakrishnan, A., Eric, M., & Liang, P. (Apr. 2017). Learning symmetric collaborative dialogue agents with dynamic knowledge graph embeddings, 1-11. (Year: 2017).*

ANSI/ASHRAE Standard 55-2013: Thermal Environmental Conditions for Human Occupancy, ASHRAE, 2013.

De Dear, et at., "Developing an Adaptive Model of Thermal Comfort and Preference," ASHRAE Transactions 1998, vol. 104, Part 1.

Gagge et al., "An Effective Temperature Scale Based on a Simple Model of Human Physiological Regulatory Response," ASIYRAE Semiannnual Meeting in Philadelphia, Pennsylyania, Jan. 24-28, 1971.

Gagge, et. al., A Standard Predictive index of Human Response to the Thermal Environment, ASHRAE Transactions 1986, Part 2B.

Medhi, et al.,Jan. 2011, "Model-Based Hierarchical Optimal Control Design for HVAC Systems," ASME 2011 Dynamic Systems and Control Conference and Bath/ASME Symposium on Fluid Power and Motion Control.

Nakahara, "Study and Practice on HVAC System Commissioning," The 4th international Symposium on HVAC, Beijing, China, Oct. 9-11, 2003.

Nassif, et al., "Self-tuning dynamic models of HVAC system components", Energy and Buildings 40 (2008) 1709-1720.

Nassif, Nabil, (2005), Optimization of HVAC control system strategy using two-objective genetic algorithm [microform].

Qin et al., "Commissioning and Diagnosis of VAV Air-Conditioning Systems," Proceedings of the Sixth International Conference for Enhanced Building Operations, Shenzhen, China, Nov. 6-9, 2006.

Salsbury et al., "Automated Testing of HVAC Systems for Commissioning," Laurence Livermore National Laboratory, 1999, LBNL-43639.

Vaezi-Nejad, H.; Salsbury, T.; Choiniere, D. (2004). Using Building Control System for Commissioning. Energy Systems Laboratory (http://esl.tamu.edu); Texas A&M University (http://www.tamu.edu). Available electronically from http : / /hdl .handle .net /1969 .1 /5060.

Welsh, "Ongoing Commissioning (OCx) with BAS and Data Loggers," National Conference on Building Commissioning: Jun. 3-5, 2009.

Xiao et al., "Automatic Continuous Commissioning of Measurement Instruments in Air Handling Units," Building Commissioning for Energy Efficiency and Comfort, 2006, vol. VI-1-3, Shenzhen, China.

* cited by examiner

AUTOMATED METHOD OF GENERALIZED BUILDING AUTOMATION FROM ATOMIC PHYSICAL MODELS AND CONTROL LOOPS THEREOF

FIELD

The present disclosure relates to the control of building systems using automated means. More specifically, the present disclosure relates to an automated method of identifying and classifying individual control units from a physical system model.

BACKGROUND

Buildings contain a varied and complex set of systems for managing and maintaining the building environment. Building automation systems are used to automate the control of many separate systems, such as those used for lighting, climate, security, entertainment, etc. Building automation systems can perform a number of functions, such as automation of equipment scheduling, monitoring of building parameters, optimization of resource consumption, event or alarm reporting and handling, as well as many others. Automated systems in buildings optimize performance, for example reducing cost and increasing convenience.

A component of the building automation system is the control system (also called control loop, controller). In general, a control system is a system consisting of one or more devices that directs, regulates, or otherwise controls the function of another system or systems. Controllers may be model-based (comprising a mathematical model of the controlled system for simulation and prediction purposes) or they may be model-free (lacking any such mathematical model). Furthermore, these controllers have provisions to either incorporate parameter-feedbacks or not from the building automation system.

Building automation systems are comprised of numerous control systems, each responsible for controlling some aspect of the building, cooperatively with other controllers. Such systems are capable of flexible control of various building parameters, but are generally time and labor intensive to install. Identifying what controllable units exist within a building, classifying them, and devising a control policy, regime, and/or scheme has generally been a manual process. The enormity of such a task in even modestly sized buildings makes building automation systems typically expensive, hard to adapt to varying circumstances and setups, and often leads to less than optimal performance.

Almost all building controls today are model-free. The model-free approach, while simple to implement, becomes quite difficult to manage and optimize as the complexity of the system increases. It also lacks the inherent self-knowledge to provide new approaches to programming, such as model-driven graphical programming, or to govern the interconnections between components and sub-system synergistics.

Physical model based approaches are relatively new in this space, and have only recently become feasible due to advances in embedded system CPU performance. There have been some recent academic efforts demonstrating aspects of model-based control. In one such study a physical HVAC model was built for a system with heuristic coefficient tuning of the model to the system under control (Nassif, 2005). While this work was a successful demonstration of the potential impact of physical models on control, the scope was limited to a predetermined system configuration under investigation without any ad hoc construction, GUI inputs, or model evolution. In a newer study, physical models were shown to accurately model both the building space and the HVAC components (Maasoumy, 2011), but went no further than the prior art.

Research in attempting to improve the state of the art by automating the building automation process has gained impetus in recent times, as reflected in the following cited inventions. For example, U.S. Ser. No. 11/537,191 seeks to automate the component selection process with the goal of minimizing energy consumption. Said invention provides a system for recommending alternate building equipment configurations, simulating the performance of said alternates, and evaluating the cost and energy savings of said alternates, allowing for selection of the best performing configuration. U.S. Ser. No. 10/044,036 demonstrates a means whereby application controllers can self-configure based on a profile corresponding to said controller type. U.S. Ser. No. 09/054,696 provides software architecture for object-oriented system development to interact with building automation devices and perform building automation functions.

Despite the efforts to improve building automation systems, no solutions exist that completely address the aforementioned challenges with building automation systems. Nor do solutions exist to provide physical model-based control without relying on hand-constructed scenarios, human-in-the-loop, human supervision, and/or limiting the scope of the controlled systems to a known set of topologies.

PATENT CITATIONS

| Number | Date | Title |
| --- | --- | --- |
| U.S. 09/054,696 | 3 Apr. 1998 | Software components for a building automation system based on a standard object superclass |
| U.S. 10/044,036 | 22 Nov. 2005 | Small building automation control system |
| U.S. 11/537,191 | 29 Sep. 2006 | Building automation system with automated component selection for minimum energy consumption |

Non-Patent Citations

Apart from the cited inventions as well as their upper limit of operations, quite a few non-patent citations are in vogue that brings forth the advancement in building automation system in recent times.

Hand-picked non-patent literatures as that by Maasoumy, Mehdi et al titled, "Model-based hierarchical optimal control design for HVAC systems" published in *ASME* 2011 *Dynamic Systems and Control Conference and Bath/ASME Symposium on Fluid Power and Motion Control*, American Society of Mechanical Engineers, 2011 talks about bi-level hierarchical control architecture for balancing comfort and energy consumption within each room of the buildings on a simplified, yet accurate, model of the temperature within each room of the building. It also measures the effectiveness of our approach by simulation using validated models.

Another paper by Nassif, Nabil, et al titled, "Optimization of HVAC control system strategy using two-objective genetic algorithm" published in *HVAC&R Research* 11.3 (2005): 459-486 specifies an intelligent building technology using a multi-objective genetic algorithm that permits the optimal operation of the building's mechanical systems when installed in parallel with a building's central control system. The paper also evaluates many control strategies applied in a multi-zone HVAC system.

SUMMARY OF THE INVENTION

An object of the present disclosed invention is to provide a model-based approach for control of building automation system, thereby providing a predictive estimation of system state thereby enabling increased comfort, performance, and/or efficiency.

Another object of the present disclosure is to provide an autonomous means of automation and control from the disaggregation of an n-complex system model description, such that its constituent simpler sub-systems may be reasoned about and controlled in an unsupervised approach.

Another object of the present disclosure is the use of a reasoning system approach, thereby enabling a machine-intelligent use of the reasoned decisions as heuristics.

A still further object of the disclosure is enabling an improved user feedback and system transparency.

To achieve any of the above objects, the present disclosure describes a method of classifying units of control and concomitant model units from a physical system model, wherein each unit is atomic and contains at least one source (sink, and transport for some measurable resource) and at least one sensor for measuring said resource; a threshold function for actuating resource transports in control units based on the corresponding model unit; a reasoning system that produces machine-interpretable, human-readable, and natural language descriptions of the decisions and reasons for said decisions made during the classification process.

Other advantages of one or more aspects will be apparent from consideration of the following drawings and description.

BRIEF DESCRIPTION OF DRAWINGS

This disclosure presents embodiments in detail with reference to the following figures wherein.

REFERENCE NUMERALS

Figure 1:
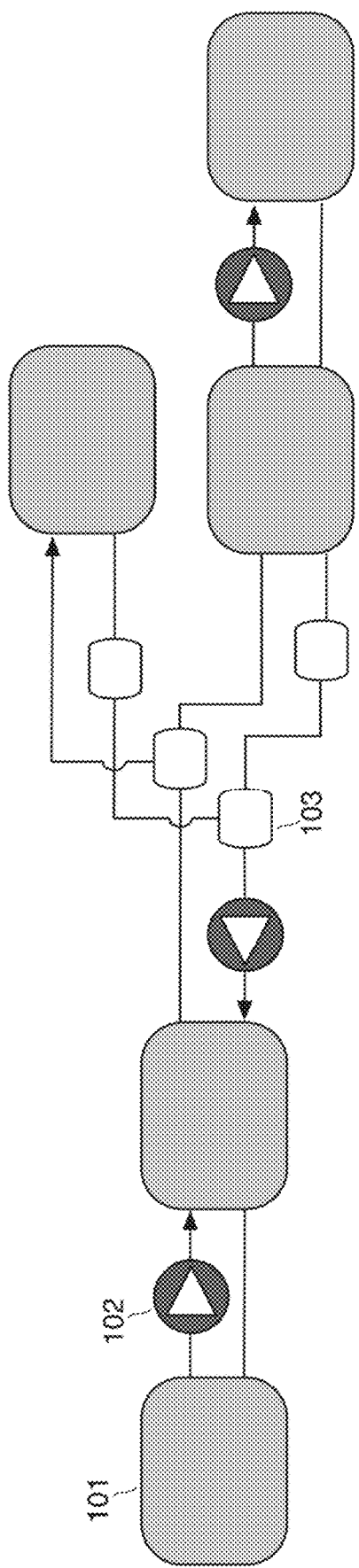
FIG. 1 illustrates a generic physical model network.

The following conventions are used for reference numerals: the first digit indicates the figure in which the numbered part first appears (the first two digits are used for the figure number when required). The remaining digits are used to identify the part in the drawing.

| | | | |
|---|---|---|---|
| 101 | generic source/sink component | 102 | generic transport component |
| 103 | generic intermediate component | 201 | atomic equipment group path |
| 202 | atomic model unit | 203 | source component |
| 204 | sink component | 205 | implicit transport component |
| 301 | load/system head | 302 | transport |
| 303 | mixer | 304 | router |
| 305 | cooling source | 306 | store (virtual heat source) |
| 307 | heating source | 308 | transport |
| 309 | transport | 310 | heat source |
| 401 | physical equipment group | 402 | physical model unit |
| 501 | control loop source | 502 | control loop actuator |
| 503 | control loop sink | 504 | sensing device |
| 505 | threshold function | 506 | physical model |
| 601 | alternative sensing locations | 701 | inferred unit of control |
| 702 | inferred control source | 703 | inferred control actuator |
| 704 | inferred control sink | 705 | inferred feedback |

DETAILED DESCRIPTION OF EMBODIMENTS

Explanation will be made below with reference to the aforementioned figures for illustrative embodiments concerning the present disclosure.

In its fundamental form, a building control system contains a control loop, consisting of a controller, a system under control, and sensors for gathering data about the state of the controlled system. The controller makes decisions based on the sensor feedback. The control decisions are then applied to the controlled system. The resulting effects on the system are monitored by the sensors. One embodiment of a building control loop comprises an air temperature sensor, a thermostat controller, and a controlled system comprising a furnace, fan, air conditioner, and building. In this embodiment, the furnace and air conditioner are sources, the fan is a transport, and the building is an energy sink.

A controller may contain a simulation engine. The simulation engine allows the system to predict the outcome of any possible control action using a physical model of the controlled system, which can be very useful in the control process. The physical model can be any model of the controlled system and may be time variant. One source of time variance that may be present in the physical model is heuristics. By employing heuristics, any control action can be evaluated, based on sensor feedback, to ensure that the control action had the intended effect. If the control action did not have the intended effect the physical model can be modified to exert more effective control actions in the future.

The naïve approach to model-based control uses the entire system model in a brute-force simulation to derive a control solution. This approach has at least two major disadvantages: brute-force simulation of the entire system can be expensive, especially in the common case where only a small subset of the system is of current interest. Secondly, reasoning about how and why the resulting control solution was selected is difficult, if not impossible, to do at any useful level of detail since the controlled components are tightly coupled and the control solution was produced from a system-wide simulation. This obstructs a machine-intelligent approach from using computed control solutions in heuristic methods.

The present invention classifies individual units of model derived from a larger system model for use in the controller.

FIG. 1 shows one embodiment of a system of source/sink components 101, transport components 102, and intermediate components 103, represented as a block diagram. With many interconnected components, the system model can be quite complicated. This makes simulations relatively inefficient, requiring system-wide simulation for predicting the behavior of a single component.

Figure 2:
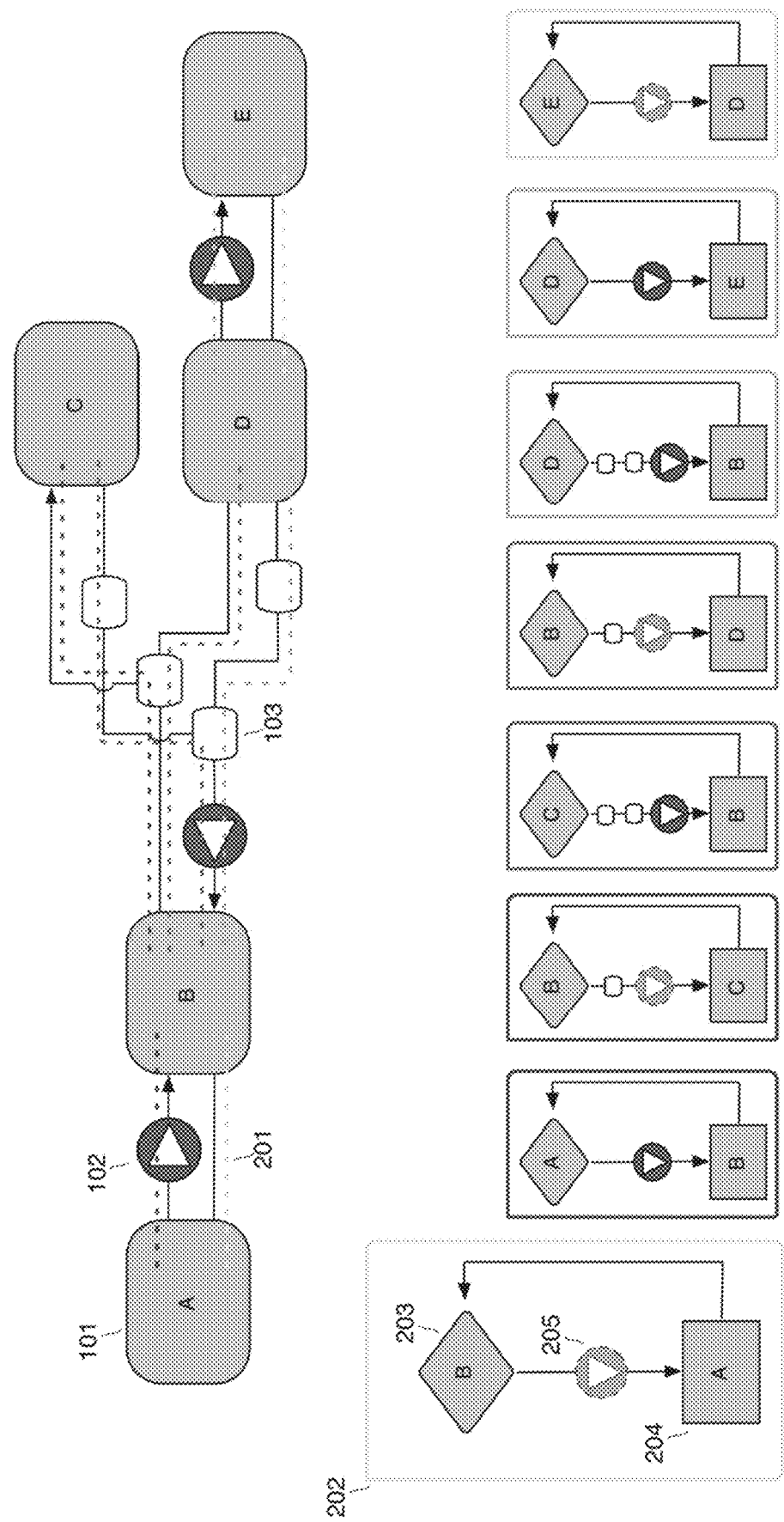
FIG. 2 illustrates the decomposition of a generic physical model network into atomic model units of the present disclosure.

FIG. 2 shows how individual units of a model may be classified within the larger, generic system. The paths 201 indicate connections between source and sink components, via any transport or intermediate components, and the corresponding control loop 202. Within the corresponding control loop is shown the source device 203, the sink device 204, and the transport device or an implicit transport device 205.

Figure 3:
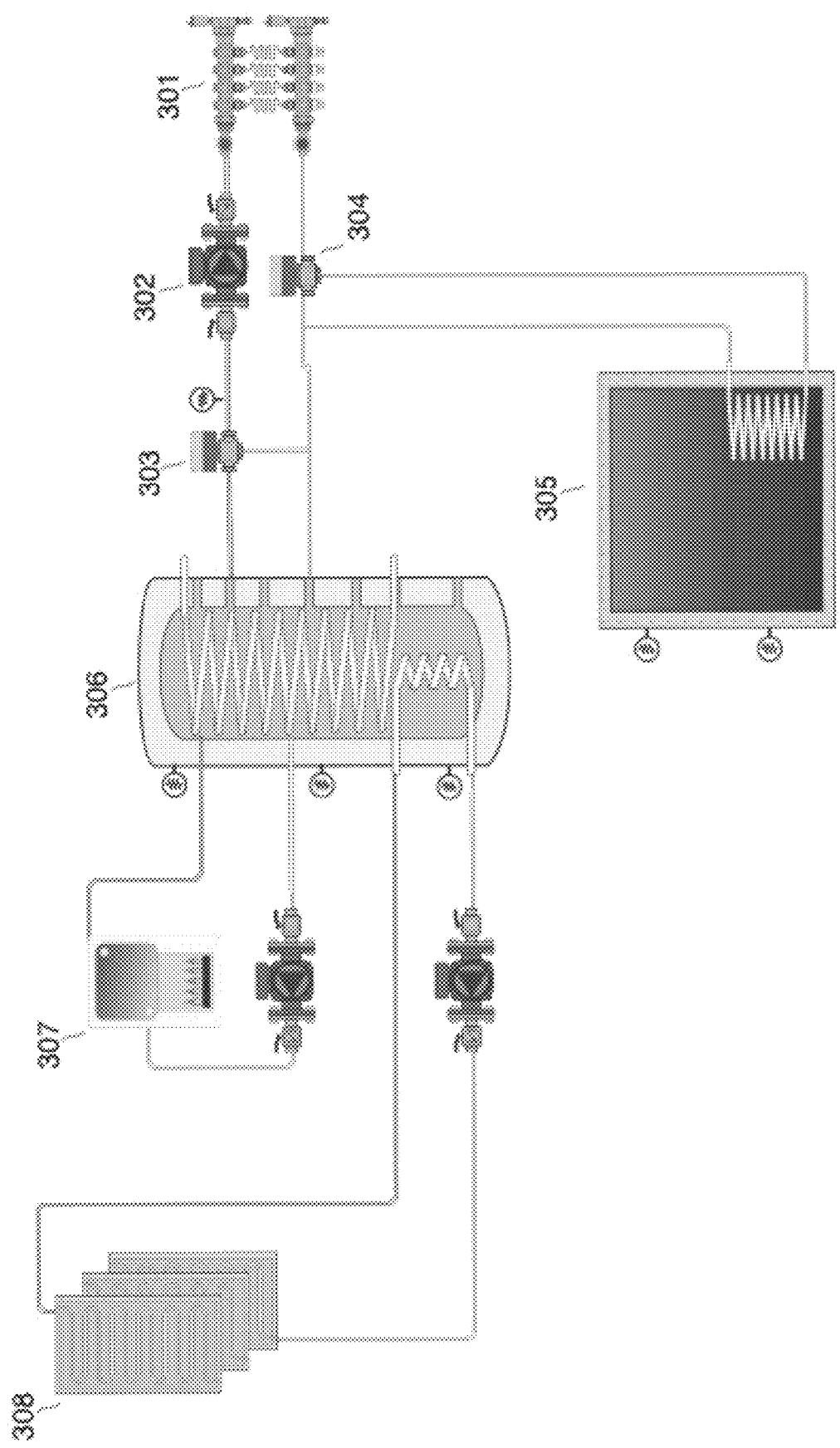
FIG. 3 shows an embodiment of a physical model network of the present disclosure.

FIG. 3 shows a more realistic embodiment of a larger system. The load/system head 301 connects via transport 302 into store 306. From the store 306 paths exist to a cooling source 305 or to load 301, via mixer 304. The illustrated system also contains loops between store 306 through heating source 307 with an explicit transport, as well as between store 306 and solar thermal hot-water panel 308 with an explicit transport.

Figure 4:
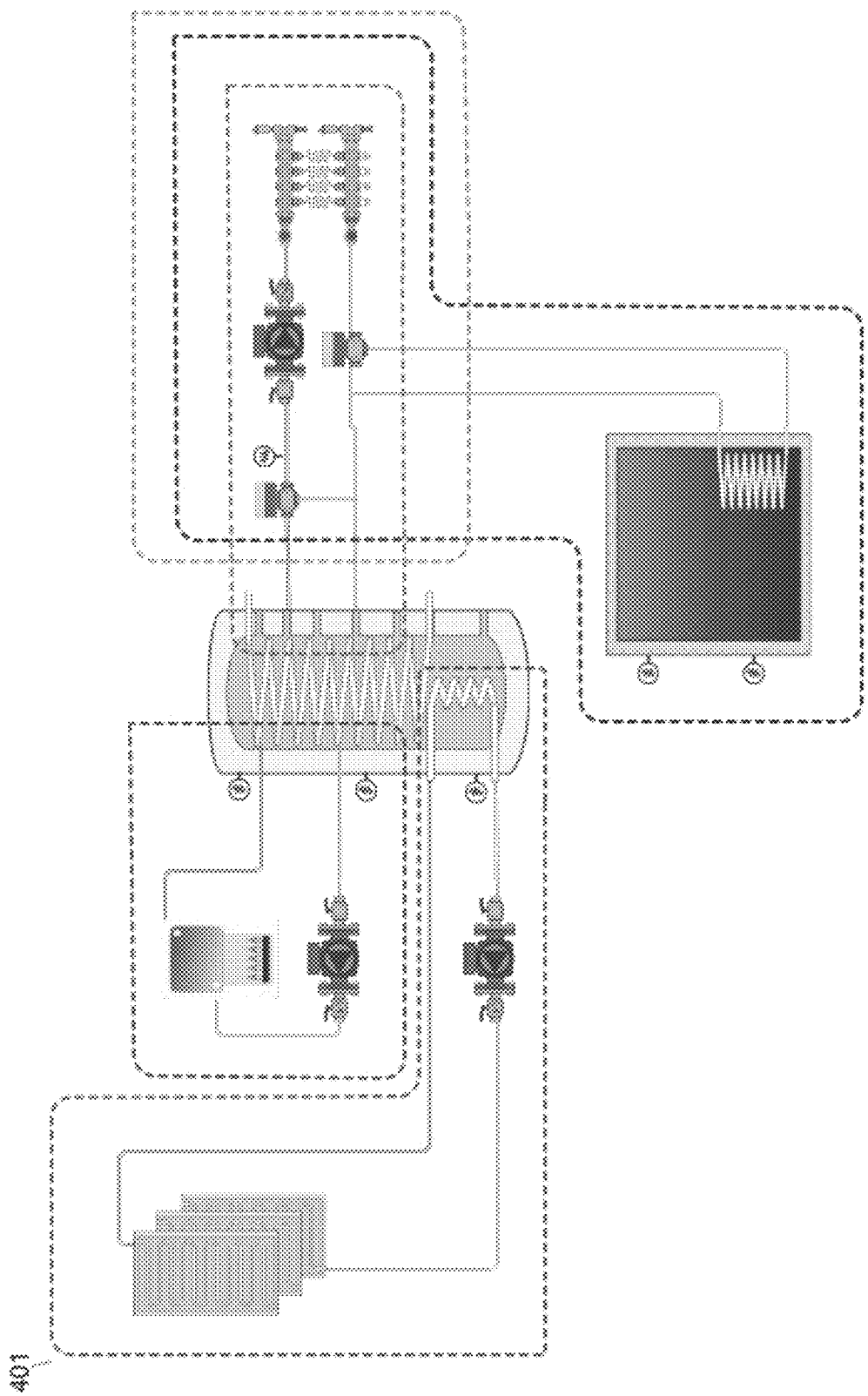
FIG. 4 shows the decomposition of an embodiment of a physical model network into atomic model units of the present disclosure.

FIG. 4 illustrates how the embodied system in FIG. 3 can be classified into numerous atomic units of model 401 and the corresponding control loop 402. The illustrated system in FIG. 3 is a common embodiment, but we see in FIG. 4 that the control of that system is simple.

To maximize efficiency and transparency, each model unit must be exploreable in an automated way and must be understandable and able to be independently reasoned about. The present disclosure provides for these two requirements in the following ways:

The model units classified from the larger system model imply a concomitant control scheme for each unit, wherein each control scheme is extractable from the identified model unit.

Figure 5:
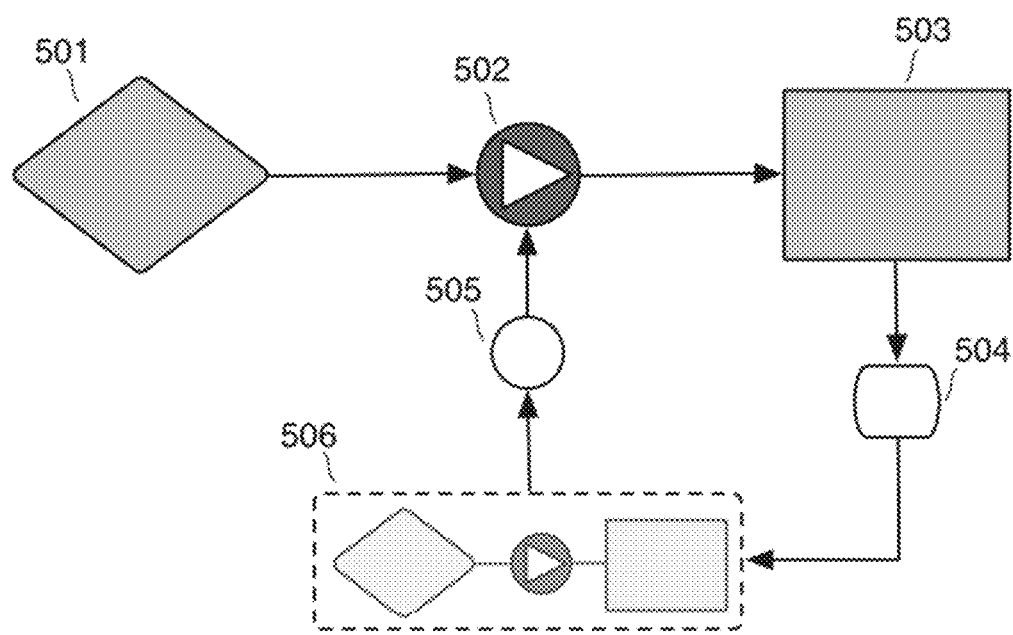
FIG. 5 shows an embodiment of a model-based control loop of the present disclosure.

FIG. 5 shows an embodiment of the model based control loop, wherein the source 501 is connected to the sink 503 via a control loop actuator transport 502. The sensing device 504 gathers data on the state of the sink which is passed to the physical model 506, the output of which is passed through the threshold function 505 and back to the actuator to complete the control loop.

Figure 6:
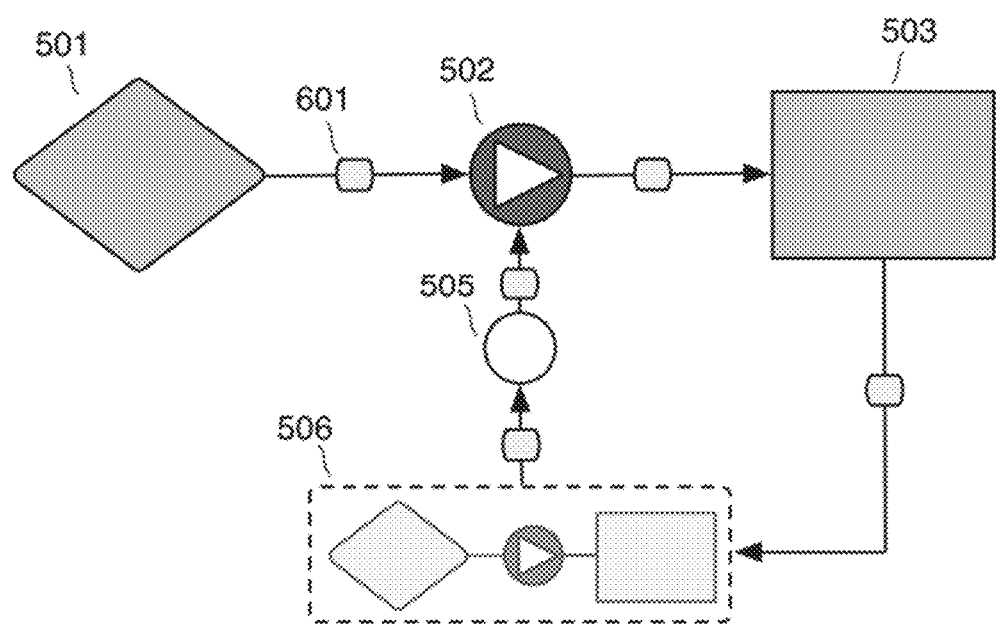
FIG. 6 shows embodiments of possible device locations in a model-based control loop of the present disclosure.

FIG. 6 illustrates other possible embodiments with different sensor placements 601. Sensors may be placed in any one or more of these locations to form a valid, alternative embodiment.

Figure 7:
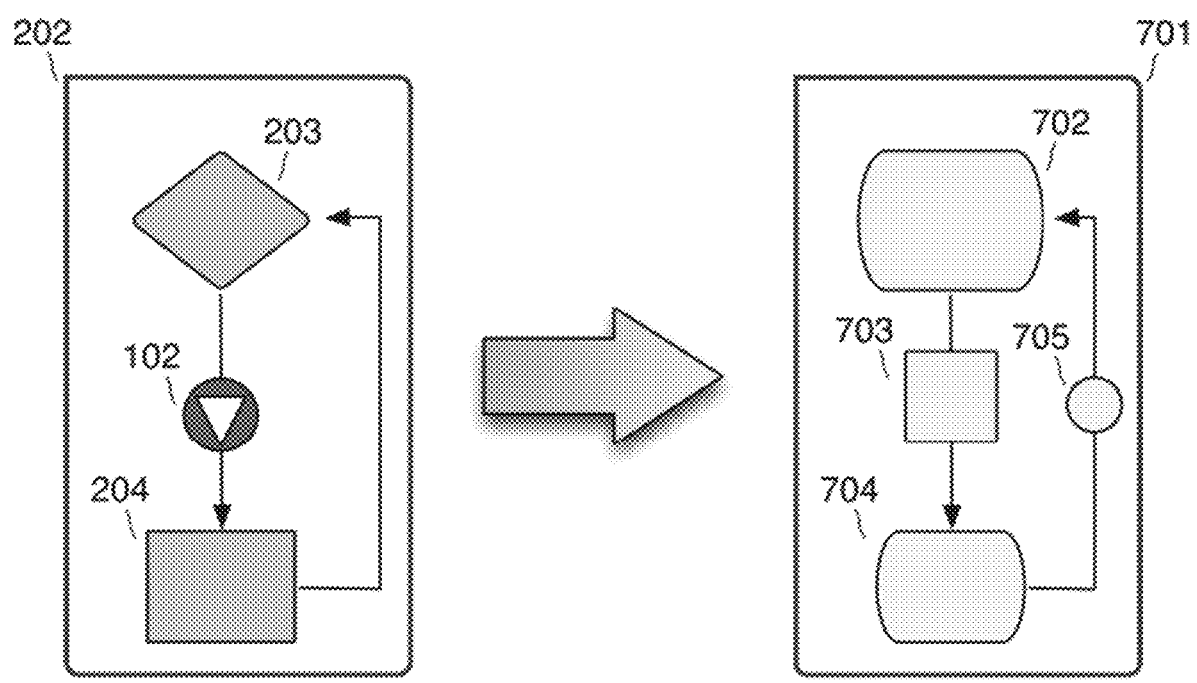
FIG. 7 shows an embodiment of an inference of a control loop from a physical model of the present disclosure.

FIG. 7 shows such a concomitant unit of control can be inferred from a model unit. The unit of control 701, with the inferred source 702, actuator 703, sink 704, and feedback 705, may be inferred from the atomic model unit 202. The extracted atomic model unit 202 and concomitant model unit 701 can be used in simulation, thereby enabling simulation of specific units of control of interest without the inefficiency of requiring entire system simulations. Decoupling units for simulation purposes vastly reduces the search space for the simulation, allowing for much greater efficiency.

The present disclosure describes a method of classifying individual atomic units in a physical model and tries to infer concomitant units of control from a physical model scheme. Through such a method, a physical system under control can be replicated. Each atomic unit comprises a source, a sink, a transport, a sensor, a threshold, and a control loop where the source comprises a physical model which is further comprised of a producer, originator, or input of a measurable resource. The source may be any of thermal, energy, air, or water source which may be generated through utility generated electricity, site generated electricity, boiler, steam generator, gas turbine, gas heater, chiller, heat pump, adsorption heat pump, ground source heat pump, furnace, air conditioner, evaporative cooler, photovoltaics, solar hot water collector, wind turbine, hydro turbine, liquid or solid thermal storage tanks, mass thermal storage well, thermoelectric generators including Peltier junctions, Carnot cycle engines, Stirling engines, and/or water sources of irrigation.

The above mentioned sink is comprised of a physical model of at least one sink which comprises a consumer, terminator, or output of a measurable resource and wherein the said sink may be of thermal, energy, air, and/or water type which can be generated through buildings, building zones, building surfaces, building surface interlayers, electric batteries, electric loads, outdoor surfaces including snow melt surfaces, irrigation consuming masses, HVAC system equipment, functional control equipment, lights, motors, liquid or solid thermal storage tanks, mass thermal storage, and/or phase change materials.

The above mentioned transport is comprised of a physical model of at least one actuated means of transport which is interposed between the source and the sink, such that it forms a controlled system.

As earlier mentioned, the sensor of the present invention provides a means of feedback for the system wherein the sensor forms a feedback data source to simulate the physical model.

The atomic unit of the present invention simulates the physical behavior of an individual unit of model with the physical model unit inferring a control loop.

Further, the above mentioned classified units may be consumed by an automated reasoning system which uses the atomic units as a reasoning entity in a knowledge graph. This makes actionable decisions using the atomic units of physical model to actuate the inferred concomitant units, thereby providing a reasoned description of and motivation for the steps taken in the process of classifying the individual atomic units. Further, the reasoning system may be used algorithmically to select only the relevant atomic units of control to simulate system behavior, thus achieving computational efficiency.

The reasoning system provides detailed knowledge about which decisions are to be made in the classification process and why a typical decision is to be made. Whereas the naïve solution executes a brute-force simulation to produce a control solution for the larger system—leaving no means whereby the process can be understood on a more fine-grained level—the present disclosure reasons about the control of each unit individually, thereby leaving a machine-interpretable record explaining the motivation behind decisions at an atomic unit level. Such detailed reasoning and description is useful to the machine in not only reasoning about the implications of decisions but also as a heuristic for future decisions. Additionally, the machine-interpretable record is translatable to a human-readable or natural language format, allowing the controller to relay knowledge about the justification for and outcome of decisions to users, thereby increasing visibility into the system.

The foregoing disclosure describes one possible embodiment of this invention, with no indication of preference to the particular embodiment. A skilled practitioner of the art will find alternative embodiments readily apparent from the previous drawings and discussion and will acknowledge that various modifications can be made without departure from the scope of the invention disclosed herein.

Accordingly, the reader will see that the method for automating the classification of control units from a physical model of various embodiments disclosed herein can be used to effectively improve the current state of art, enabling more efficient and understandable model-based control of a system.

The above mentioned resources may have a value applied to them. The value may be monetary, economic, comfort, equipment longevity, and/or resource utilization. The value may have a discount and/or compound rate applied to it. The threshold may be computed from the value.

What is claimed is:

1. A method comprising:
classifying individual atomic units of a physical model proxying a physical system under control, wherein each atomic unit comprises a source, a sink, a transport, a sensor, a threshold, and a control loop;
inferring atomic units of control from the physical model;
consuming, by an automated reasoning system, the classified atomic units as reasoning entities in a knowledge graph to provide a reasoned description of and motivation for the classifying of the individual atomic units;
using the knowledge graph to make actionable decisions using the atomic units of the physical model to actuate the inferred atomic units of control; and
whereby:
the source comprises a physical model of at least one source;
the sink comprises a physical model of at least one sink;
the transport comprises a physical model of at least one actuated means of transport; and
wherein:
the transport is interposed between the source and the sink, so that it forms a controlled system;
the sensor comprises at least one sensor providing a means of feedback for the controlled system;
the atomic unit simulates a physical behavior of the individual atomic units of the physical model;
the physical model infers the control loop;
the sensor forms a feedback data source to simulate the physical model;
the threshold is a function of a state of the physical model; and
the transport is actuated by the threshold such that the control loop is formed.

2. The method of claim 1, wherein the source comprises a producer, originator, or input of a measurable resource.

3. The method of claim 1, wherein the source is comprised of at least one thermal, energy, air, or water source.

4. The method of claim 1, wherein the source is comprised of utility generated electricity, site generated electricity, boiler, steam generator, gas turbine, gas heater, chiller, heat pump, adsorption heat pump, ground source heat pump, furnace, air conditioner, evaporative cooler, photovoltaics, solar hot water collector, wind turbine, hydro turbine, liquid or solid thermal storage tanks, mass thermal storage well, thermo-electric generators including Peltier junctions, Carnot cycle engines, Stirling engines, or water sources of irrigation.

5. The method of claim 1, wherein the sink comprises a consumer, terminator, or output to a measurable resource.

6. The method of claim 1, wherein the sink is comprised of at least one thermal, energy, air, or water sink.

7. The method of claim 1, wherein the sink is comprised of buildings, building zones, building surfaces, building surface interlayers, electric batteries, electric loads, outdoor surfaces including snow melt surfaces, irrigation consuming masses, HVAC system equipment, functional control equipment, lights, motors, liquid or solid thermal storage tanks, mass thermal storage, or phase change materials.

8. The method of claim 1, wherein the automated reasoning system may be used algorithmically to select only the relevant atomic units of control to simulate system behavior.

9. The method of claim 1, wherein the reasoned description may be machine-interpretable and usable as a heuristic.

10. The method of claim 1, wherein the reasoned description provides a human-readable or natural language description that may be used to inform users, either preemptively or retrospectively.

11. The method of claim 2, wherein the resource has a value applied to it.

12. The method of claim 11, wherein the value is monetary, economic, comfort, equipment longevity, or resource utilization.

13. The method of claim 11, wherein the value has a discount and/or compound rate applied to it.

14. The method of claim 11, wherein the threshold is computed from the value.

15. The method of claim 1, wherein the knowledge graph comprises: heuristic classification methods, probabilistic models, graphical models, Bayesian networks, neural networks, knowledge base, BDI models, factor graphs, Markov random fields, Markov chains, Markov decision processes, partially observable Markov decision processes, hidden Markov models, or self-organizing maps.

16. The method of claim 1, wherein the knowledge graph includes heuristic classification methods comprised of decomposition methods, inductive methods, reduction methods, constructive methods, or local search methods.

* * * * *